(12) United States Patent
Borntraeger

(10) Patent No.: US 8,257,215 B2
(45) Date of Patent: Sep. 4, 2012

(54) MULTI-SPEED PLANETARY COUPLING GEAR

(75) Inventor: Kai Borntraeger, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 476 days.

(21) Appl. No.: 12/525,318

(22) PCT Filed: Jan. 25, 2008

(86) PCT No.: PCT/EP2008/050837
§ 371 (c)(1),
(2), (4) Date: Jul. 31, 2009

(87) PCT Pub. No.: WO2008/095789
PCT Pub. Date: Aug. 14, 2008

(65) Prior Publication Data
US 2010/0041503 A1 Feb. 18, 2010

(30) Foreign Application Priority Data
Feb. 3, 2007 (DE) .......................... 10 2007 005 438

(51) Int. Cl.
F16H 48/06 (2006.01)
(52) U.S. Cl. .................... 475/149; 475/279; 475/286
(58) Field of Classification Search .................. None
See application file for complete search history.

(56) References Cited

U.S. PATENT DOCUMENTS

| 6,592,484 | B1 | 7/2003 | Tsai et al. | |
| 6,966,860 | B2 | 11/2005 | Heitmann et al. | |
| 7,354,367 | B2 * | 4/2008 | Raghavan et al. | 475/5 |
| 7,503,865 | B2 | 3/2009 | Pichon | |
| 7,833,119 | B2 * | 11/2010 | Klemen et al. | 475/5 |
| 2006/0150766 | A1 * | 7/2006 | Gansloser et al. | 74/665 H |
| 2007/0072723 | A1 * | 3/2007 | Klemen et al. | 475/5 |
| 2007/0129202 | A1 * | 6/2007 | Raghavan et al. | 475/275 |
| 2007/0129203 | A1 * | 6/2007 | Raghavan et al. | 475/275 |

FOREIGN PATENT DOCUMENTS

| DE | 196 06 771 A1 | 8/1997 |
| DE | 197 39 906 A1 | 3/1999 |
| DE | 101 40 424 A1 | 2/2003 |
| DE | 103 12 391 A1 | 10/2004 |
| DE | 10 2005 014 332 A1 | 9/2006 |
| FR | 2 859 669 A1 | 3/2005 |

* cited by examiner

Primary Examiner — Roger Pang
Assistant Examiner — Erin D Bishop
(74) Attorney, Agent, or Firm — Davis & Bujold, P.L.L.C.

(57) ABSTRACT

A multi-speed planetary coupling transmission (3) which includes a plurality of planetary gear sets (4, 5, 6) and a plurality of shifting elements (A, B, D, E). Depending on actuation of the shifting elements (A, B, D, E), various gear ratios can be achieved by the transmission. At least one provided electric machine (EM1) is functionally connected with one of the planetary gear sets (6). From the electric machine (EM1), a torque can be introduced, via a shaft (6B) of the planetary gear set (6) associated with the electric machine (EM1), in order to support torque acting on the associated planetary gear set (6) and achieve a gear ratio in the transmission (3) via the electric machine (EM1).

4 Claims, 5 Drawing Sheets

MULTI-SPEED PLANETARY COUPLING GEAR

This application is a National Stage completion of PCT/EP2008/050837 filed Jan. 25, 2008, which claims priority from German patent application serial no. 10 2007 005 438.8 filed Feb. 3, 2007.

FIELD OF THE INVENTION

The invention relates to a multi-speed planetary coupling transmission.

BACKGROUND OF THE INVENTION

In the state of the art, power-shifted automatic transmissions are often designed as planetary coupling transmissions or as countershaft transmissions, which are designed on the primary side or the transmission-input side, with a starting element that is preferably designed as a hydrodynamic torque converter or as a starting clutch. In this case, various gear ratios of the transmission can be achieved by means of frictionally engaged shifting elements such as wet multi-disk clutches or multi-disk brakes.

SUMMARY OF THE INVENTION

In order to be able to change gears under load in these transmissions, the shifting element of the target gear assumes the load, whereby synchronization in the transmission is achieved in a slip mode of the shifting element of the target gear. During a power-shift of this kind, there is frictional work due to the slip mode in the region of the frictionally-engaged shifting element, which is transformed into heat.

In addition, there are known power-shifted transmissions that are designed as duplex-clutch transmissions, in which pre-selection of a gear takes place in the partial gear mechanism, which is not under load before the gear change, and the disengaged and wet or dry operating clutch assigned to this partial gear mechanism takes over the load during engagement, when the partial gear mechanism is synchronized with the transmission input shaft during a slip mode of this clutch. Here, in the case of duplex-clutch transmissions, which have assumed their motion state after pre-selection of the gear in one of the two partial gear mechanisms, in comparison with planetary coupling transmissions or countershaft transmissions, only the drive motor remains to be brought to the target speed of the target gear via the dual clutch.

The above described transmission types are designed with various components for actuating the transmission, by means of which frictionally engaged shifting elements such as clutches or brakes are electrohydraulically actuated. In particular, frictionally engaged shifting elements designed as wet operating clutches or brakes must be supplied with a sufficient volume of cooling oil during operation in order to discharge the frictional heat that is generated in slip mode. For both actuation and cooling-oil supply, these transmissions are designed with an hydraulic control system that is designed in a manner known per se with at least one hydraulic pump device as well as other components. In addition, there are also known transmissions which, instead of having multi-disk clutches or multi-disk brakes, are designed with synchronizers, which are also operated by means of the corresponding actuating elements and cause frictional loss during operation.

Disadvantageously, compared with manual transmissions, the above transmissions are characterized by poor overall transmission efficiency due to the frictional losses and the electrohydraulic control, whereby deterioration of efficiency is also caused by the rated input of the pump of an hydraulic pump device of an electrohydraulic control system and the drag torques that are generated in the region of the wet-operating multi-disk clutches and multi-disk brakes. It is also a disadvantage that especially when a vehicle with the previously described transmission types is in coasting mode, no energy recovery can be carried out.

Drive train systems with which energy recovery can be carried out are so-called hybrid drives that are designed with an electric machine on the input side. Such electric machines are also used, among other things, as electrodynamic starting elements.

Planetary gear sets are usually associated with electrodynamic starting elements as summarizing transmissions, where in each instance a sum shaft of a planetary gear set is connected to the transmission input of a conventional transmission. A second shaft of such a planetary gear set is connected to an electric machine or an electrodynamic starting element, while a third shaft of a planetary gear set is functionally connected to an internal combustion engine of a drive train. One shaft of the planetary gear set is braked during a starting operation of a vehicle by means of the electric machine, which, for example, is connected to a sun gear of the planetary gear set associated with the electrodynamic starting element. When there is zero-crossing of the rotational speed of the shaft that is connected to the sun gear, the electric machine switches from generator operation to motor operation and accelerates the shaft to the rotational speed of the shaft that is connected to the internal combustion engine. When that speed is reached, all of the shafts of the planetary gear set rotate at the same speed, and the planetary gear set is bridgeable via a clutch. This kind of starting operation is wear-free, and there are losses only in relation to energy conversion and storage, as well as due to gearing and torques in the region of the powershift torques.

The effect of an electrodynamic starting element during power-shifting in an associated transmission is disadvantageously limited to such an extent that in transmissions, shifting operations that are free of traction interruptions can be carried out only by using frictionally-engaged shifting elements, but these have an adverse effect on the efficiency of a transmission.

SUMMARY OF THE INVENTION

It is therefore the object of the present invention to provide a multi-speed planetary coupling transmission that can be operated with good efficiency.

The inventive multi-speed planetary coupling transmission is designed with a plurality of planetary gear sets and a plurality of shifting elements, whereby, subject to actuation of the shifting elements, various gear ratios can be achieved. Advantageously at least one electric machine is provided, which has a functional connection with one of the planetary gear sets, whereby torque can be introduced in the associated planetary gear set by the electrical machine via a shaft of the planetary gear set associated with the shaft, in order to support torque acting on the associated planetary gear set via the electric machine in order to achieve a gear ratio in the planetary coupling transmission.

Basically, the electric machine replaces a preferably frictionally engaged power-shifting element of a conventional planetary coupling transmission. By using the electric machine, hybrid functions such as electrodynamic, reduced-loss starting operations, regenerative braking processes, etc., can be carried out in addition to transmission functions such as power-shifts, wear-free starting operations and the like. The hybrid functions that can be performed by the electric machine depend on the characteristics of the gear set and the power class of the electric machine.

Furthermore, an inventive multi-speed planetary coupling transmission can be simply designed in various increments, whereby a drive chain of a vehicle designed with the inventive multi-speed planetary coupling transmission can be designed without a starting element, such as a hydrodynamic torque converter or a frictionally engaged starting element. Furthermore, a multi-speed planetary coupling transmission, which in the case of this invention is executed with an electric machine on the site of a shifting element instead of frictionally-engaged power-shifting elements, can be designed with claw couplings and an hydraulic system that is reduced to providing lubricant oil to the gear set.

This means that in comparison with conventional planetary coupling transmissions, with an inventive multi-speed planetary coupling transmission which is designed with claw clutches that can be actuated by using electromotor actuating elements, for example, with the corresponding activation and arrangement of an electric machine that replaces a shifting element of the planetary coupling transmission, shifting operations without traction interruption can be carried out in a simple and cost-efficient manner.

BRIEF DESCRIPTION OF THE DRAWINGS

Additional advantages and advantageous further developments of the invention can be seen from the patent claims and exemplary embodiments that are described in principle with reference to the drawings, where, in the interest of clarity in describing the different exemplary embodiments, the same reference signs are used for components with the same construction and function.

DETAILED DESCRIPTION OF THE PREFERRED EMBODIMENTS

Figure 1:
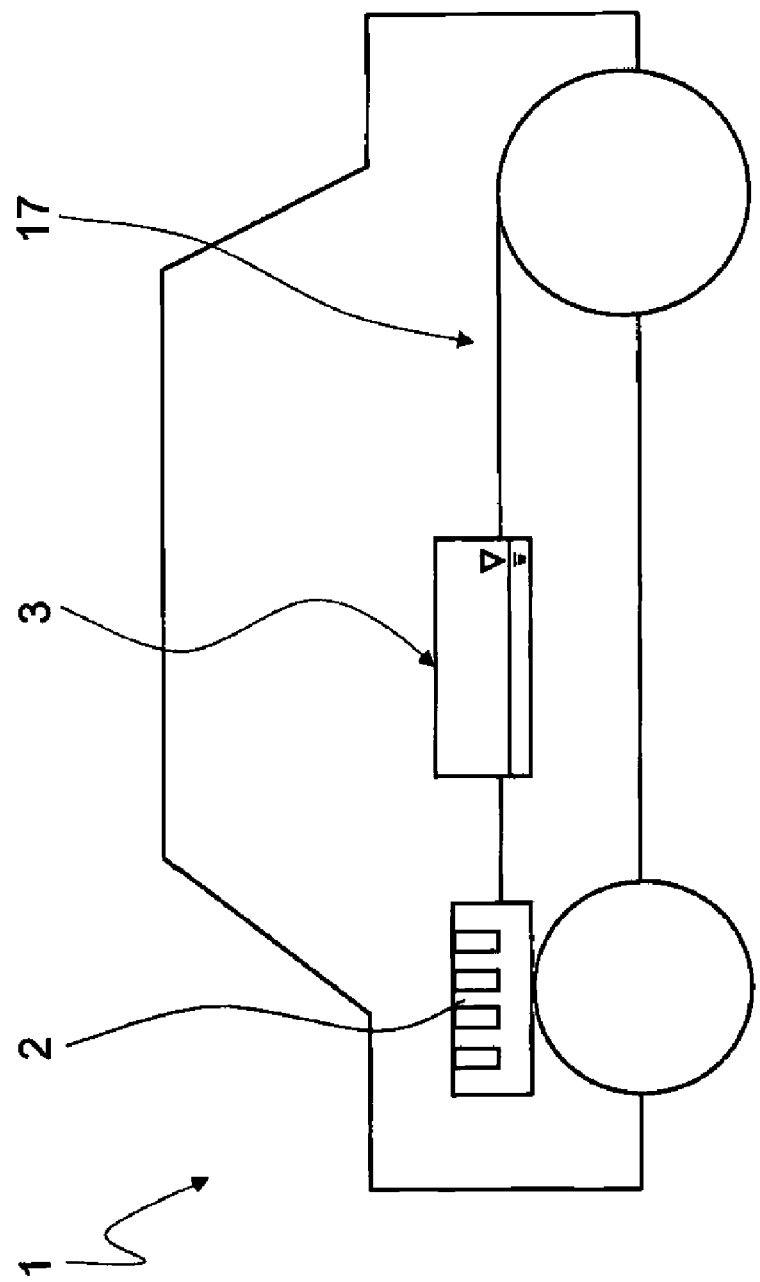
FIG. 1 a highly schematic representation of a drive train of a vehicle, which is designed with a multi-speed planetary coupling transmission.
Figure 2:
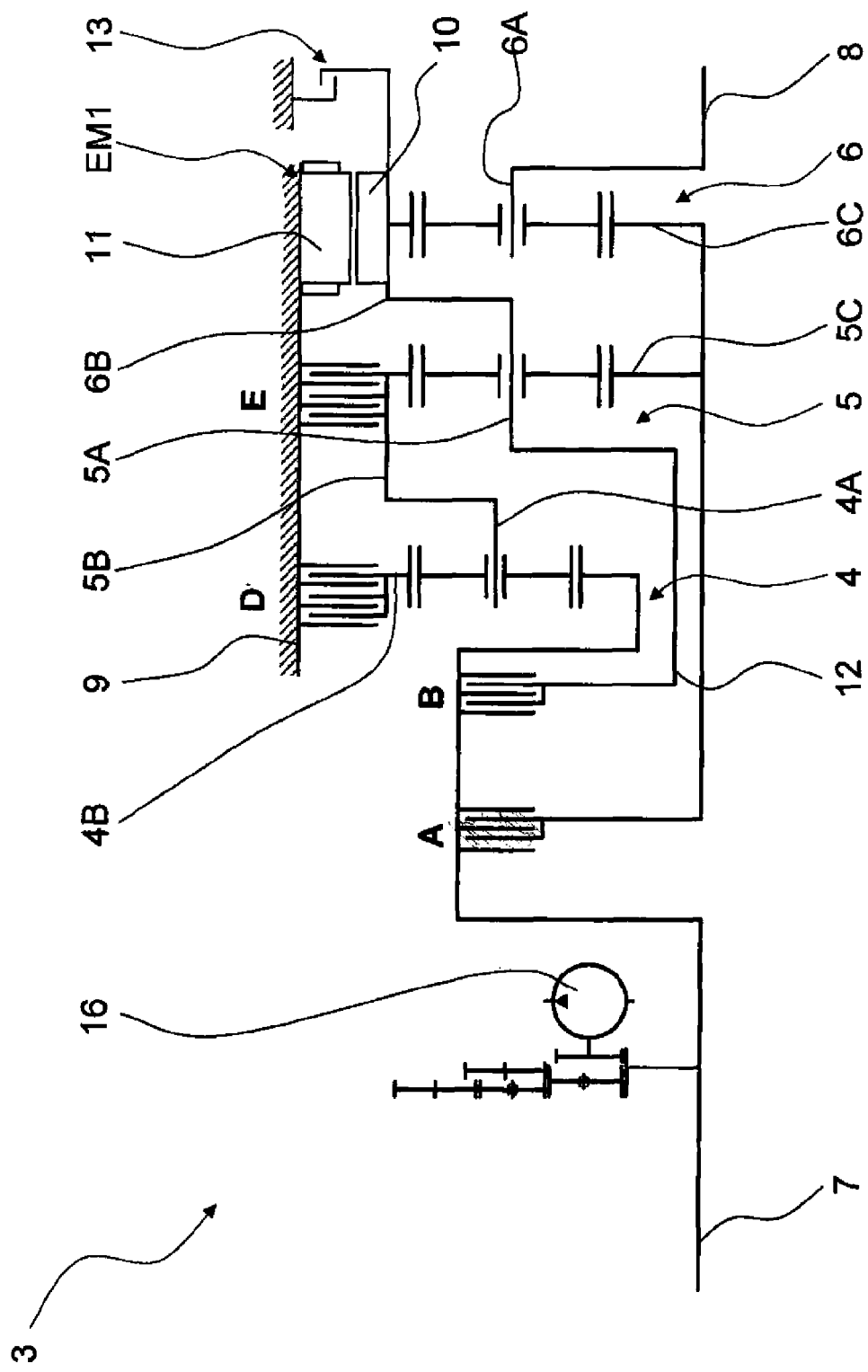
FIG. 2 a gear diagram of a first embodiment of the inventive multi-speed planetary coupling transmission.
Figure 3:
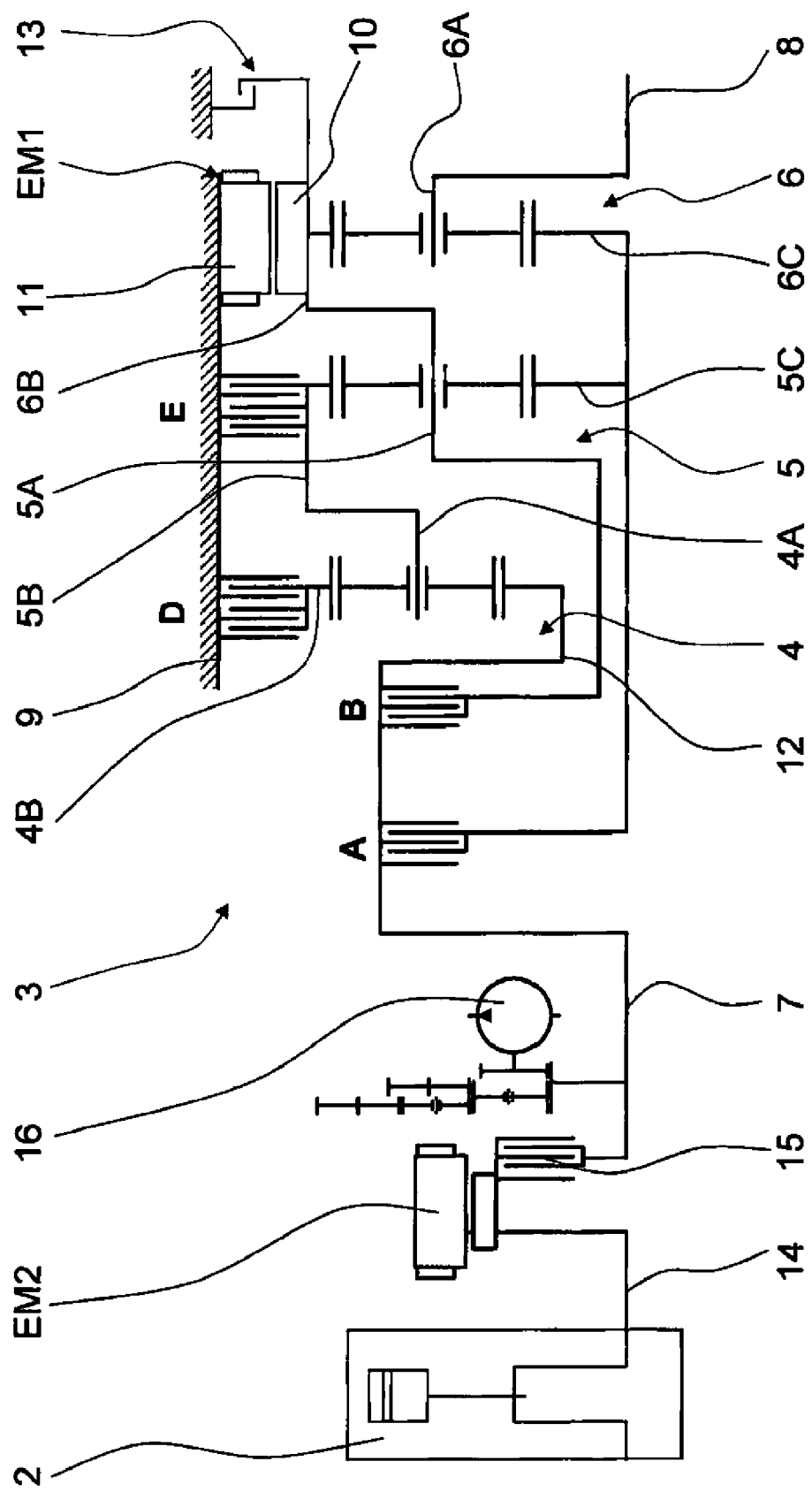
FIG. 3 a gear diagram according to FIG. 2 in connection with an electric machine designed as a crankshaft-starter-generator unit for an internal combustion engine.
Figure 4:
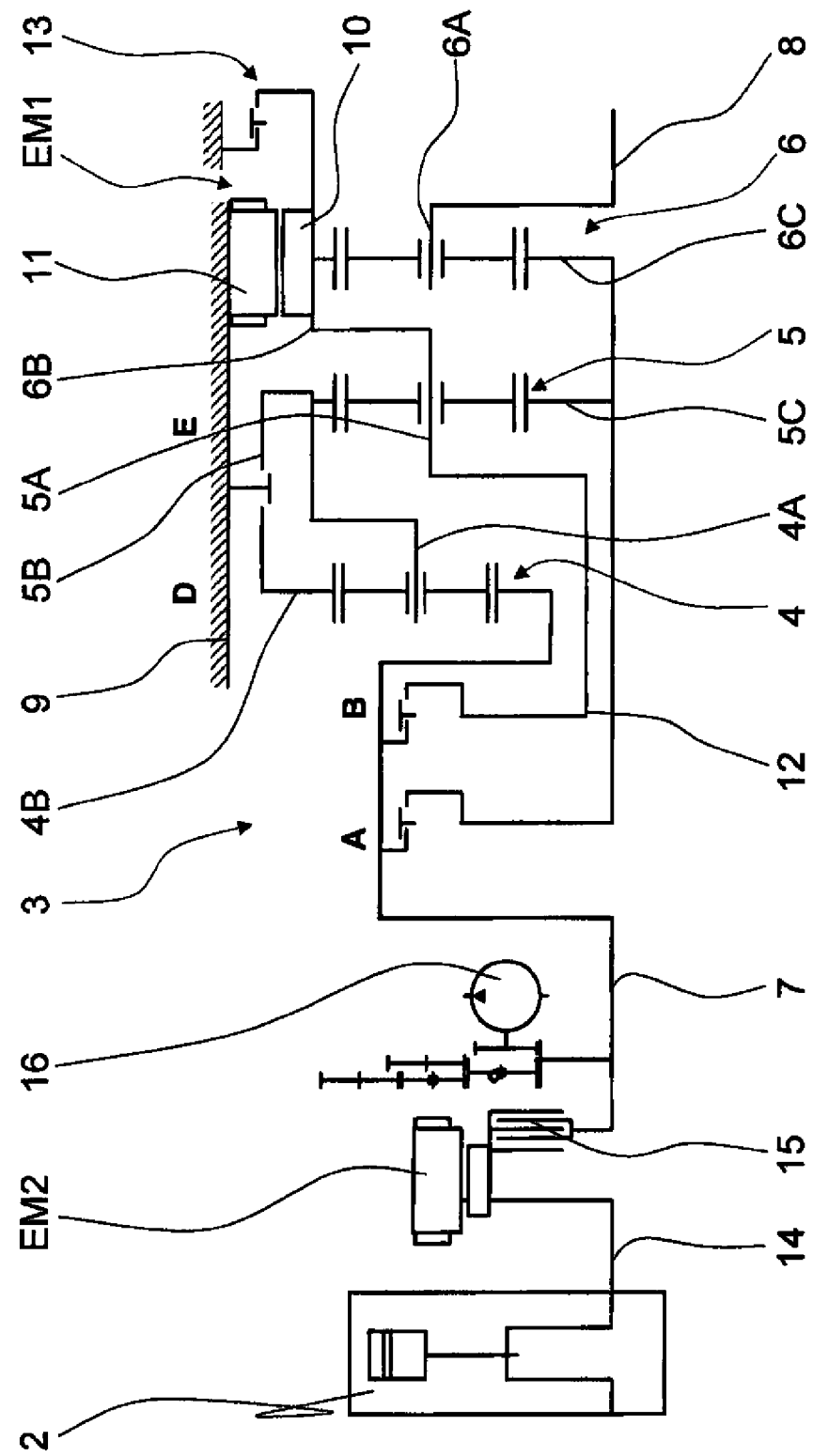
FIG. 4 a gear diagram of a second embodiment of the inventive multi-speed planetary coupling transmission.

FIG. 1 shows a highly schematized presentation of a drive train 17 of a vehicle 1 that is designed in a manner known per se with an internal combustion engine 2 and a multi-speed planetary coupling transmission 3. In FIG. 2 to FIG. 4, various embodiments of the planetary coupling transmission 3 are depicted in the form of gear diagrams that will be explained in more detail in the following description.

Fundamentally, with the forms of embodiments of the planetary coupling transmission 3 shown in the drawing, which depict only exemplary embodiments, six forward drive ratios and one reverse drive ratio can be achieved. The various gear ratios are depicted depending on actuation of various shifting elements A, B, D, E, and an electric machine EM1 shown here as a synchronizing machine.

Here the shifting elements A, B, D, E are designed in each case as frictionally engaged shifting elements in the exemplary embodiment shown in FIG. 2. A rotor 10 of the electric machine EM1 is connected here with the ring gear 6B of the third planetary gear set 6, while a stator 11 of the electric machine EM1 is functionally connected with a housing 9 in a rotateably fixed manner.

In all of the embodiments shown in the drawing, the planetary coupling transmission 3 features three planetary gear sets 4, 5, 6, designed in each case with three shafts, where a planet carrier 4A of the first planetary gear set 4 is functionally connected to a ring gear 5B of the second planetary gear set 5. In addition, a planet carrier 5A of the second planetary gear set 5 is functionally connected to a ring gear 6B of the third planetary gear set, while sun gears 5C and 6C of the second planetary gear set 5 and the third planetary gear set 6 are permanently connected to each other and can be functionally connected to a transmission input shaft 7 by means of a shifting element A, which is designed as a frictionally engaged clutch. A planet carrier 6A of the third planetary gear set 6 is functionally connected with a transmission output shaft 8 of the planetary coupling transmission 3.

The shifting elements D and E are designed as frictionally engaged multi-disk brakes, where in each case one half of the shifting elements D, E is fixed to the housing, and the other half as connected to the ring gear 5B of the second planetary gear set 5, or to a ring gear 4B of the first planetary gear set 4, in order to connect the ring gears 4B and 5B of the planetary gear sets 4 and 5 in a rotationally fixed manner to the housing 9 of the planetary coupling transmission 3, in order to achieve various transmission stages of the planetary coupling transmission 3.

A first transmission stage of the planetary coupling transmission 3 is achieved by engaging the shifting element A and during a generator operation of the electric machine EM1, during which time torque acting on the third planetary gear set 6 is supported by the electric machine EM1, whereby the ring gear 6B of the third planetary gear set 6 can be set to zero by the electric machine EM1. At the same time, a starting operation can be carried out by means of the electric machine EM1, similar to that carried out by an electrodynamic starting element when a transmission shaft 12 is braked by a corresponding operation of the electric machine EM1.

In order to limit energy consumption by the electric machine EM1 during achievement of the first transmission stage or the starting ratio of the planetary coupling transmission 3, a positive-locking shifting element 13 designed as a claw shifting element is provided, by means of which the ring gear 6B of the third planetary gear set 6 can be connected in a rotationally fixed manner to the housing 9, or a component of the planetary coupling transmission that is fixed to the housing.

When there is a shift, starting from the first transmission stage and an engaged positive-locking shifting element 13, the positive-locking shifting element 13 is unloaded via the electric machine EM1 before being disengaged, or shifting takes place without load, and the shifting element can therefore be shifted in a simple and wear-free manner, whereby with a disengaged positive-locking shifting element 13, the torque acting on the third planetary gear set 6 is supported by the electric machine EM1 in order to achieve the first transmission stage.

Because the vehicle is seldom operated for an extended period of time in the first transmission stage, and because as a rule soon after a brief starting phase of a vehicle, there is a subsequent gear transition from the first transmission stage to a second transmission stage, in order to achieve a powershift with as little loss and interruption of traction as possible, it is provided that the transmission shaft 12 be brought up to a speed, using the electric machine EM1, that the shaft has with the second transmission stage engaged in the planetary coupling transmission 3. This operating state of the planetary coupling transmission 3 can be achieved in a simple manner by feeding power or torque from the electric machine into the third planetary gear set 6, whereby in the planetary coupling transmission 3, during synchronization of the transmission shaft 12 by means of the electric machine EM1, the first transmission stage remains engaged, and the torque conditions that apply then are present in the planetary coupling transmission 3.

By changing the speed of the transmission shaft 12 from the speed of the ring gear 5B that is equivalent to the first transmission stage in the direction of the speed equivalent to the second transmission stage, which is essentially zero, the two halves of the shifting element E will be synchronized by means of the electric machine EM1. The shifting element E will be engaged without loss at the synchronization point. Fundamentally, this procedure can be used for all upward or downward shifts in the planetary coupling transmission 3, in order to keep power loss in planetary coupling transmissions as low as possible.

In principle, a vehicle equipped with the planetary coupling transmission 3 according to FIG. 2 can be driven without wear, because the torque of the internal combustion engine 2 is supported without contact in the region of the electric machine EM1. In addition, with simultaneously engaged shifting elements D, E, and A, and with the internal combustion machine 2 switched off, purely electrical operation of the vehicle 1 is also possible using the electrical machine EM1, whereby fuel consumption of the vehicle 1 can be reduced in a simple manner. In addition, recuperation operation is possible via the electric machine EM1 in a coasting mode of the vehicle 1, and during engine operation of the electric machine EM1, so-called boost operation is possible, whereby during boost operation, a drive torque from the electric machine is added to the output of the vehicle 1, in addition to the drive torque of the internal combustion engine 2.

The exemplary embodiment of the planetary coupling transmission shown in FIG. 3 is designed with an additional electric machine EM2, which is designed as a crankshaft-starter-generator unit, wherein a motor output shaft 14 can be put into functional connection with the transmission input shaft 7 via a frictionally engaged clutch 15. The additional electric machine EM2 is essentially provided for start-stop operation of the internal combustion engine 2 and for supplying electricity to the electric machine EM1 during engine operation. With this embodiment of the planetary coupling transmission 3, motor-start-stop operation and electric, power-split drive operation can be realized in addition to the previously described range of functions provided via the electric machine EM1, in a simple and cost-effective manner.

FIG. 4 shows a gear diagram of an additional exemplary embodiment of the inventive planetary coupling transmission 3 that is essentially a further development of the planetary coupling transmission shown in FIG. 3. The shifting elements A, B, D, and E of the planetary coupling transmission 3 according to FIG. 4 are executed as positive-locking shifting elements, whereby the planetary coupling transmission 3 is a claw-shifted hybrid planetary transmission with an electric machine EM1, with which shifting operations under load can be performed that are virtually loss-free and free of traction interruptions when the shifting elements A, B, D, E are synchronized with maximum effectiveness during shifting operations via the electric machine EM1. Here the planetary coupling transmission 3 according to FIG. 4, in comparison with the embodiment of the planetary coupling transmission according to FIG. 3, can be operated with a better degree of efficiency by designing the shifting elements A, B, D, E as positive-locking shifting elements, or as claw-shifting elements, because in the region of disengaged claw shifting elements or positive-locking shifting elements, in contrast with disengaged frictionally-engaged shifting elements, no significant drag torque occurs.

Basically the degree of efficiency of the planetary coupling transmission 3 also depends on the actuating elements used in each case for operating the shifting elements A to E. Hence the efficiency of the planetary coupling transmission 3 according to FIG. 4, which is designed with positive-locking shifting elements, can be additionally improved if the shifting elements A to E are not actuated by means of the hydraulic system of the planetary coupling transmission 3, as is usually the case, but rather by means of an electromotor drive or the like. In such cases, the hydraulic system of the planetary coupling transmission 3 is designed with an hydraulic pump device 16 with reduced power consumption compared with the pump of a conventional hydraulic system, because only a lubricant oil circuit of the planetary coupling transmission has to be supplied by the pump device, and therefore a smaller flow of medium is required.

In order to design the electric machine EM1 with smaller outer dimensions, the drive torque of the internal combustion engine 2 is reduced during load transfer to higher transmission stages. This results from the fact that during load transfer in the planetary coupling transmission 3, torques act as they do in the engaged first transmission stage, whereas speed conditions in the planetary coupling transmission 3 correspond to those in the presently-engaged higher transmission stage. If the drive torque of the internal combustion engine 2 is not reduced, the electric machine EM1 must have very large dimensions in order for it to be able to support the drive torque of the internal combustion engine 2. Without a reduction in the drive torque of the internal combustion engine, when shifting upward from the third to the fourth transmission stage, the torque at the output rises from 1.421 times the transmission input torque to 3.364 times the transmission input torque, and the electric machine must produce 1.36 times the power of the internal combustion engine, if the first transmission stage has the value 3.364, for example, and the third transmission stage the value 1.421.

Basically, even with the exemplary embodiment of the inventive multi-speed planetary coupling transmission 3 shown in FIG. 4, it is possible to have both recuperation operation in coasting mode and boost operation during positive acceleration operation of the vehicle, in addition to wear-free starting operation. Furthermore, the internal combustion engine 2 can also be designed with an engine-stop-start function, and there can be power-split electrical operation of the vehicle, in order to provide a vehicle with lower fuel consumption.

If the planetary coupling transmission 3, as shown in FIG. 2, is designed without the additional electrical machine EM2, a safety margin of electrical energy must be provided in the form of an electrical accumulator associated with the electric machine EM1 for motor operation of the electric machine EM1 during achievement of the first transmission stage. In other respects, in order to achieve the additional transmission stages of the planetary coupling transmission 3, the electric machine EM1 can be operated under generator power in wide operational areas, and electric energy can be generated by the electric machine EM1, which can be used to charge an electric accumulator associated with the electric machine EM1.

Figure 5:
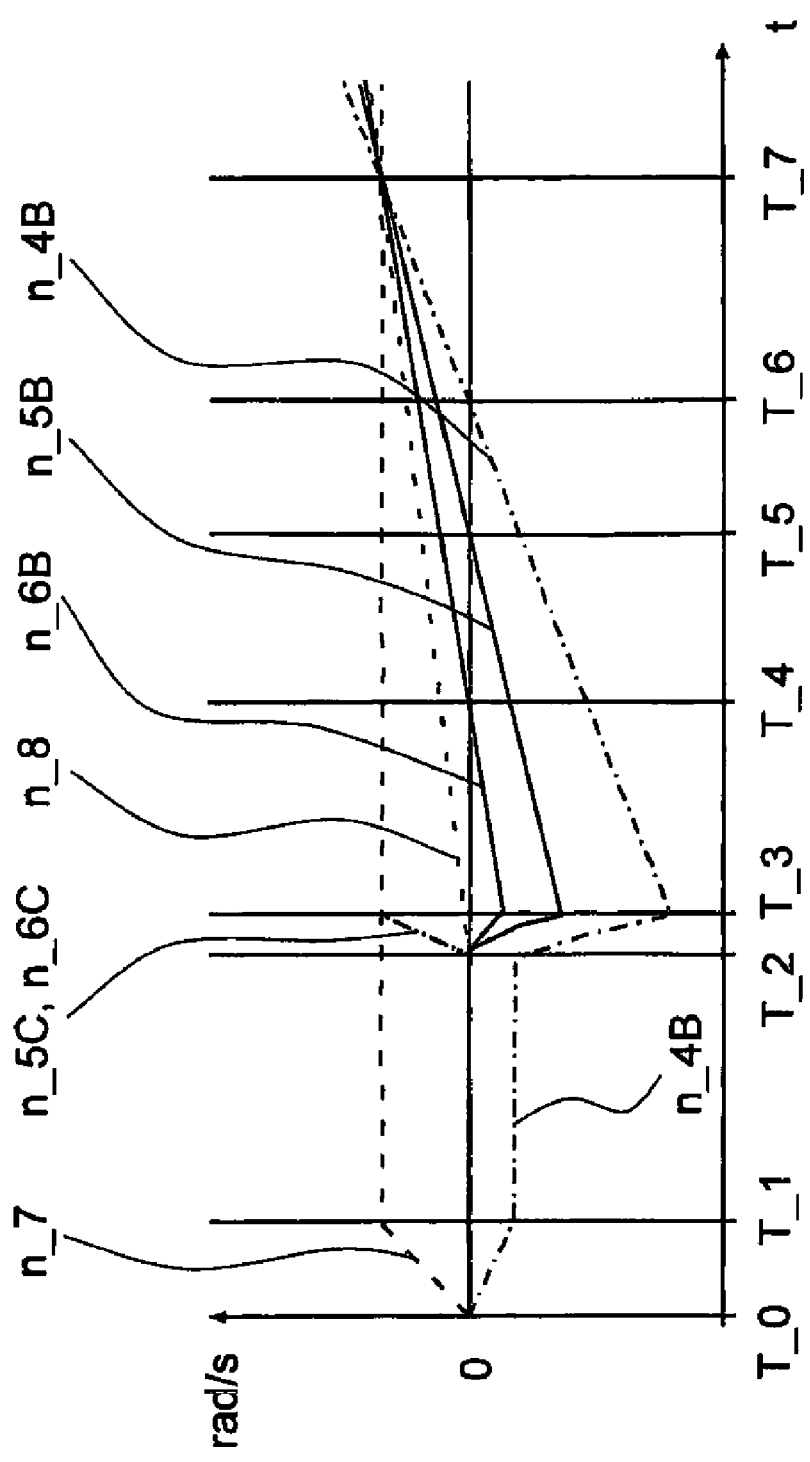
FIG. 5 speed curves of various shafts of the inventive multi-speed planetary coupling transmission that occur over a period of time depending on the actuation of an electric machine assigned to a planetary gear set.

FIG. 5 shows a plurality of speed curves for various transmission shafts of the planetary coupling transmission 3 over a period of time t, the curves occurring during a plurality of consecutive upshifts in the planetary coupling transmission 3 according to FIG. 2, or FIG. 3, or FIG. 4, when the electric machine EM1 is operated in the manner described below, in order to perform shifting operations with the least possible loss and traction interruption.

At a point in time T_0, the speed n_7 of the transmission input shaft 7 increases due to drive by the internal combustion engine or electric machine and/or the additional electric machine EM2, and from a point in time T_1, it is held constant at this level. At the same time, the ring gear 4B of the first planetary gear set 4 starts to turn, in the opposite direction, at the speed n_7 of the transmission input shaft 7, reaching the speed of the ring gear 4B of the first planetary gear set 4 with the shifting elements A, B, D disengaged due to the speed n_7 of the transmission input shaft 7 and the fixed gear ratio of the first planetary gear set 4.

The speed n_5B of the ring gear 5B of the second planetary gear set 5, the speed n_6B of the ring gear 6B of the third planetary gear set 6, and the speeds n_5C and n_6C of the sun gears 5C and 6C of the second planetary gear set 5 and the third planetary gear set 6 are zero between the points in time T_0 and T_2. At the time T_2, the shifting element A is engaged, and the speed levels n_5C and n_6C of the sun gears 5C and 6C are equal to the speed n_7 of the transmission input shaft 7, while the levels n_5B and n_6B of the ring gears 5B and 6B increase in the manner described in FIG. 5 up to a time T_3.

At the time T_3, the electric machine EM1 is operated by generator power and decelerates the ring gear 6B of the third planetary gear set 6, whereby the speeds n_4B and n_5B of the ring gears 4B and 5B are reduced. At a time T_4, the speed n_6B of the ring gear 6B of the third planetary gear set 6 is zero, and the first transmission stage is engaged in the planetary coupling transmission 3, whereby in this operating state of the electric machine EM1, no more electrical energy is generated. The speed n_8 of the transmission output shaft 8 increases continuously after startup of the electric machine EM1 from the time T_3.

After the time T_4, the ring gear 6B is driven by the now motor-operated electric machine EM1, which leads to a rise in the speed n_8 of the transmission output shaft 8 and the speed 6B of the ring gear 6B, as well as a reduction in the speeds n_4B and n_5B of the ring gears 4B and 5B. At a time T_5, the speed n_5B of the ring gear 5B of the second planetary gear set is zero, and the shifting element E is synchronized by means of the electric machine EM1, whereby the second transmission stage is engaged in the planetary coupling transmission 3 when the shifting element E is engaged.

If the speed n_6B of the ring gear 6B is increased further by the motor-driven electric machine EM1 after the time T_5 in the manner shown in FIG. 5, the speed of the ring gear n_5B increases with a disengaged shifting element E. The ring gear 4B is stationary at the time T_6, so that the shifting element D is synchronized by means of the motor-driven electric machine EM1 and can be engaged without wear. If the shifting element D is engaged, the third transmission stage is engaged in the planetary coupling transmission.

After the time T_6, the ring gear 6B is driven faster by the electric machine EM1, and its speed n_6B further increased, until all shafts of the planetary coupling transmission 3, at the time T_7, exhibit the same speed, and the shifting element B is synchronized. In this operating state of the planetary coupling transmission, the shifting element B can be engaged without wear and loss, whereby, with an engaged shifting element B in the planetary coupling transmission 3, the fourth transmission stage is engaged.

REFERENCE NUMERALS 1 vehicle
2 internal combustion engine
3 planetary coupling transmission
4 first planetary gear set
4A planet carrier
4B ring gear
5 second planetary gear set
5A ring gear
5C sun gear
6 third planetary gear set
6A planet carrier
6B ring gear
6C sun gear
7 transmission input shaft
8 transmission output shaft
9 housing
10 rotor
11 stator
12 transmission shaft
13 positive-locking shifting element, claw
14 engine output shaft
15 clutch
16 pump device
17 drive train
A, B, D, E shifting element
EM1, EM2 electric machine
n_4B, n_5B,
n_5C, n_6B, n_6C,
n_7, n_8 speed curve
t time
T_0 to T_7 discrete point in time

The invention claimed is:

1. A multi-speed planetary coupling transmission (3) comprising:
   a transmission input shaft (7) and a transmission output shaft (8), the transmission input shaft (7) being functionally connected to an internal combustion engine (2);
   first, second and third planetary gear sets (4, 5, 6), each of the first, the second and the third planetary gear sets (4, 5, 6) having a sun gear, a planetary carrier and a ring gear;
   first, second, third and fourth shifting elements (A, B, D, E) which are actuatable to implement various gear ratios in the multi-speed planetary coupling transmission (3);
   a first electric machine (EM1) having a stator (11) and a rotor (10), the stator (11) being fixed to a housing (9) and the rotor (10) being fixed to the ring gear (6B) of the third planetary gear set (6) such that torque generated by the first electric machine (EM1) either supports torque generated by the internal combustion engine (2) to achieve at least one of the various gear ratios, or is utilized in a starting operation;
   the sun gear of the first planetary gear set (4) is rotationally fixed to the transmission input shaft (7), and the planetary carrier (4A) of the first planetary gear set (4) is rotationally fixed to the ring gear (5B) of the second planetary gear set (5);
   the sun gear (5C) of the second planetary gear set (5) is rotationally fixed to the sun gear (6C) of the third planetary gear set (6), and the planetary carrier (5A) of the second planetary gear set (5) is rotationally fixed to the ring gear (6B) of the third planetary gear set (6); and the planetary carrier (6A) of the third planetary gear set (6) is rotationally fixed to the transmission output shaft (8).

2. The multi-speed planetary coupling transmission according to claim 1, wherein the transmission input shaft (7) is connectable, via the first shifting element (A), to the sun gear (5C) of the second planetary gear set (5) and the sun gear (6C) of the third planetary gear set (6);

the transmission input shaft (7) is connectable, via the second shifting element (B), to the planetary carrier (5A) of the second planetary gear set (5) and the ring gear (6B) of the third planetary gear set (6);

the ring gear (4B) of the first planetary gear set (4) is connectable, via the third shifting element (D), to the housing (9); and the planetary carrier (4A) of the first planetary gear set (4) and the ring gear (5B) of the second planetary gearset (5) are connectable, via the fourth shifting element (E), to the housing (9).

3. The multi-speed planetary coupling transmission according to claim 1, wherein an internal combustion engine output shaft (14) is rotationally fixed to a second electric machine (EM2) and the transmission input shaft (7) is connectable, via a clutch (15), to the second electric machine (EM2).

4. The multi-speed planetary coupling transmission according to claim 1, wherein the planetary carrier (5A) of the second planetary gear set (5), the ring gear (6B) of the third planetary gear set (6) and the rotor (10) of the first electric machine (EM1) are connectable, via a claw clutch (13), to the housing (9).

* * * * *